Oct. 25, 1949.     I. R. TAYLOR ET AL     2,485,675
COMPENSATING SYSTEM
Filed Aug. 1, 1945     2 Sheets-Sheet 2
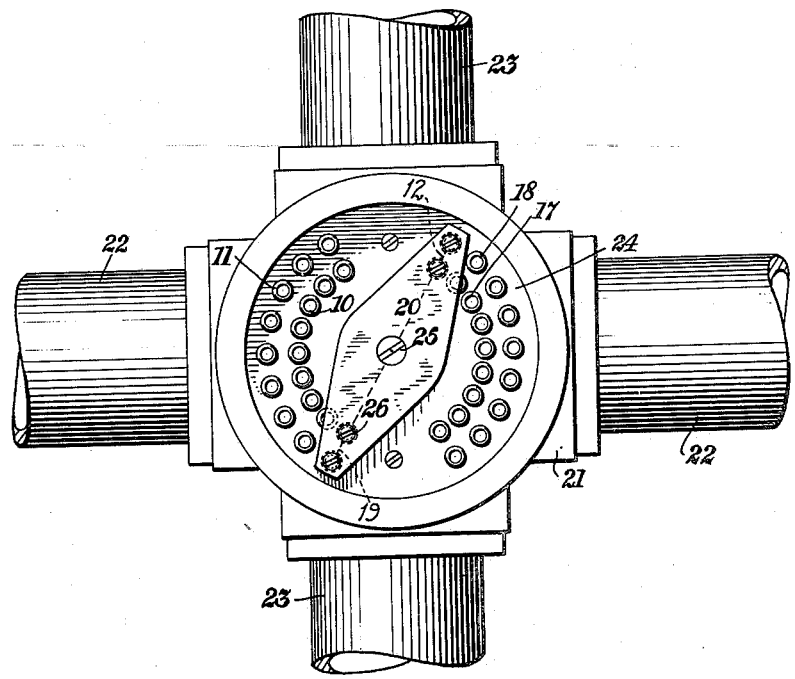
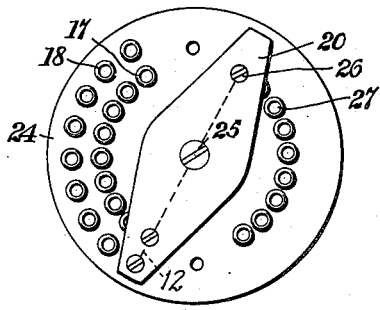 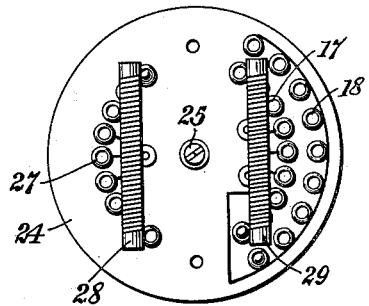
INVENTORS.
IRVING R. TAYLOR
LARS LARSSEN
BY
ATTORNEY Patented Oct. 25, 1949

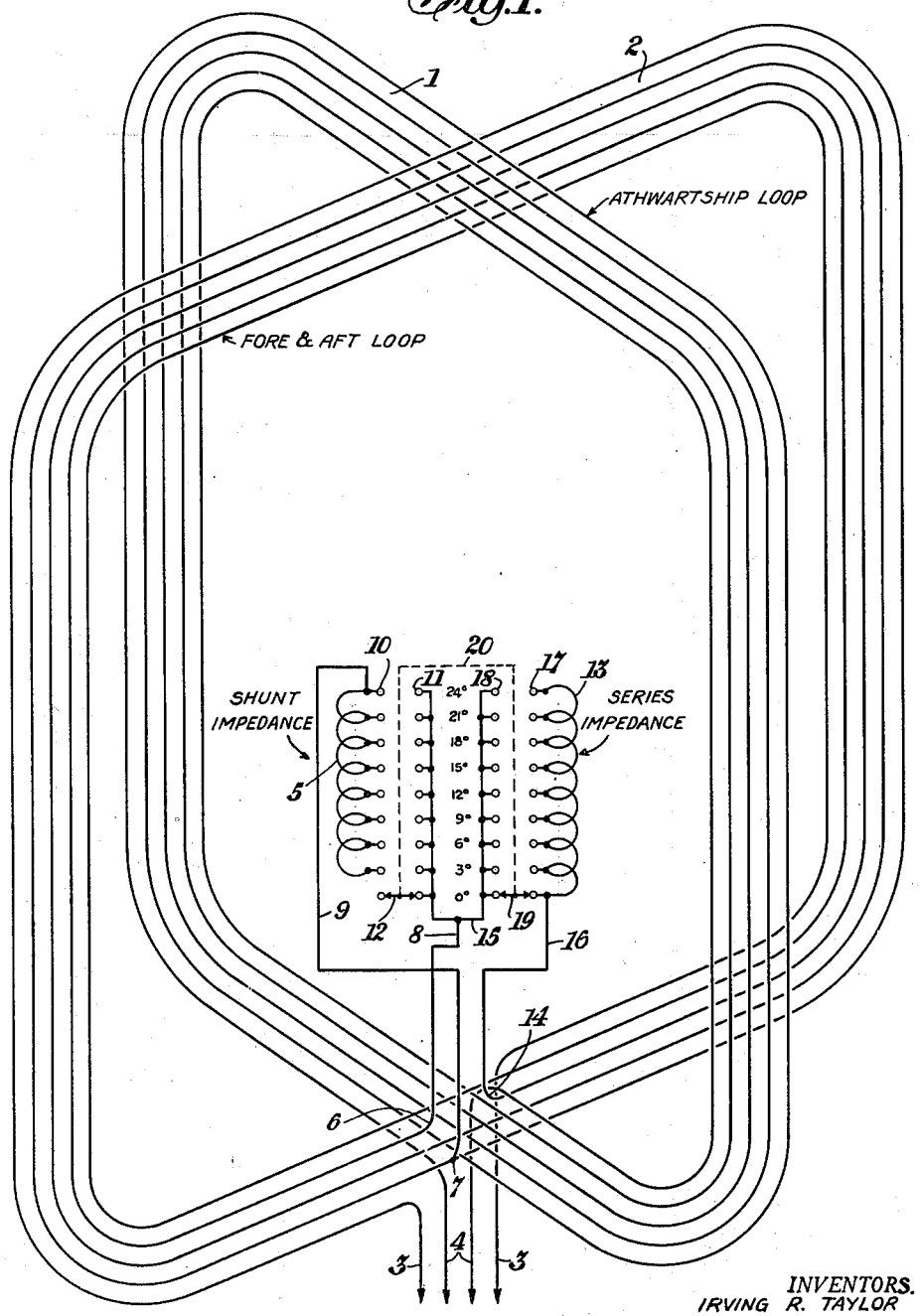

2,485,675

UNITED STATES PATENT OFFICE 2,485,675

COMPENSATING SYSTEM

Irving R. Taylor and Lars Larssen, Brooklyn, N. Y., assignors to Federal Telephone and Radio Corporation, New York, N. Y., a corporation of Delaware Application August 1, 1945, Serial No. 608,214

2 Claims. (Cl. 343—114)

This invention relates to an apparatus for decreasing the induced current in one of two or more radio wave collectors without changing the relative phases of the current induced in these collectors. More particularly it deals with an apparatus for correcting quadrantal error between direction finder antennas.

An object of this invention is to correct the induced currents, in at least one of two or more coupled radio wave collectors, due to nearby reradiating elements.

Another object is to correct for quadrantal error in one of a pair of radio wave collectors without changing the relative phase of the induced currents in the two wave collectors.

Still other objects will appear from time to time in the description which follows.

The true direction in which radio waves are traveling will be obtained only when the point of observation is remote from metal objects. Passing radio waves striking wires and other metal objects such as ship hulls, smoke stacks, guy wires, masts, stanchions, and the like induce currents that produce induction and radiation fields which, when combined with the fields of the passing waves, result in a distortion of the wave front in the vicinity of such an object. Fields from induced currents produce two effects upon direction finding equipment: (1) a deviation in the apparent direction from which the passing wave seems to arrive (herein called quadrantal error) and (2) a quadrature effect corresponding to fields 90° out of time phase with those of the passing wave.

In the case of direction finders such as employ loops and which depend upon obtaining a null for accurate indication, this quadrature component destroys the null and thereby blurs the minimum and reduces the accuracy obtainable. These errors from induced currents are particularly important in connection with loops or similar direction finders used on shipboard.

When a shipborne direction finder is located along the center line of the ship, the error, introduced by induced currents usually has a general character of a sine wave. The error is maximum for incoming radio signal arriving at 45° from the bow or stern of the ship, and either small or zero when the bearing is directly forward, astern, or to either side. This error changes in sign every 90° and the length of the hull of the ship increases the pick-up of the force in the fore-and-aft loop over that in the athwartships loop. The thus increased and induced current in the fore-and-aft loop causes the oscilloscope, coupled through a goniometer to both loops, to indicate an erroneous direction which is closer to that of the center line of the ship than is the true direction of the incoming signal. This type of error is termed quadrantal error.

Previously, there have been many different methods of correcting quadrantal error, such as: by relocating the direction finding equipment so that it is more nearly in the clear and away from from reradiating elements; by introducing a short-circuited loop strategically located with regard to the direction antennas; by the use of a correction curve for the apparatus; by employing some mechanical arrangement involving an adjustable cam to compensate for the error.

This invention deals with a new and improved apparatus for the correction of quadrantal error comprising two variable impedances placed in the circuit of one of a pair of wave collectors. One of these impedances is shunted across a portion of the wave collector and the other impedance is coupled in series with another portion of the same collector. These impedances are constructed so that they may be easily adjusted to compensate for any nearby radiating elements. The two impedances may be coupled together so that any given adjustment of the shunt impedance will automatically couple the necessary corresponding series impedance to counteract the phase change caused by that adjustment of the shunt impedance.

A better understanding of this invention and the objects and features thereof may be had by reference to the particular description of an embodiment thereof made with reference to the accompanying drawings:

Fig. 1 is a schematic circuit diagram of a pair of crossed-loop radio wave collectors incorporating one embodiment of the apparatus of this invention;

Fig. 2 is a plan view of the apparatus shown in Fig. 1, implaced in the opened base support for a crossed loop direction finder antenna;

Fig. 3 is a top view of a modification of the apparatus shown in Fig. 2; and

Fig. 4 is a bottom view of the apparatus shown in Fig. 3.

Referring to Fig. 1 of the drawings, there is shown two perpendicularly crossed-loop antennas of the type used for a direction finder aboard a ship; 1 being the athwartships loop and 2 being the fore-and-aft loop. These loops are fixed on the ship, and the ends of the wires from them are connected through lines 3 and 4, respectively, to a goniometer (not shown). Since a ship is longer than it is wide, a greater current is induced into the fore-and-aft loop than into the athwartships loop. Therefore, the apparatus of this invention is applied to loop 2 to reduce the amount of current induced therein relative to that induced in loop 1. This is accomplished by shunting a portion of the turns of wire in loop 2 through an impedance 5 connected to the loop at points 6 and 7 through lead lines 8 and 9, respectively. The impedance 5 is provided with a series of contacts tapped into it along its length which cooperates with a corresponding series of contacts 11 connected to line 8. These contacts are bridged by an adjustable conductor 12 which may be placed across any one of the series of contacts to vary the amount of the impedance shunted across the shunted turns of the loop 2. The effect of shunting an impedance across one or more turns of the loop is to reduce the inductance of the loop, thus decreasing the amplitude of the induced current.

The shunt impedance 5, that is, now coupled in the circuit of the loop 2, changes the phase of the induced currents between loops 1 and 2, and produces another type of error in the apparatus. In order to correct for this error and to keep the induced currents in both loops in phase with each other as well as proportional to the direction of the incoming wave, it is necessary to insert another impedance 13 in series with the same loop 2. Series impedance 13 may be connected adjacent to the connection to impedance 5, at points 6 and 14, through lines 15 and 16, respectively. The series impedance 13, similar to impedance 5, has a series of contacts 17 tapped at different intervals along its length which cooperates with another series of contacts 18 connected to line 15, and these contacts are bridged by an adjustable conductor 19. The two adjustable conductors 12 and 19 may be directly connected through a rigid insulating member 20 that is mounted on a slide track or pivot (not shown), so that when the bridge 12 for shunt impedance 5 is in a position to correct for quadrantal error, the series impedance 13 will be in a corresponding position to correct for any change in phase due to the position of bridge 12, and when there is no shunt across the turns of the loop 2, there is no series impedance coupled in the circuit of loop 2, as clearly shown. This series impedance also serves to correct for and maintain an impedance match between collector and line.

Fig. 2 shows a base support 21 for the shields 22 and 23 which surround a pair of crossed-loop antennas of the type shown in Fig. 1. Inside the base support (with its cover removed) is shown one embodiment of the quadrantal error correction device, the circuit of which is shown in Fig. 1. In this device the two pairs of contacts 10 and 11, and 17 and 18 are mounted in two circles on an insulation disc 24, and the rigid insulating member 20 is mounted on pivot 25 at center of the disc 24. Bridging members 12 and 19 are mounted at each end of member 20 and are provided with pegs 26 (not shown) for insertion in any group of diametrically aligned contacts 10, 11, 17 and 18. The member 20 is also movable axially along its pivot 25 so that the pegs 26 may be raised out of the contacts in the disc before being rotated to another position on the disc. Beneath insulating plate 24 are located the impedance coils 5 and 13, as shown in Fig. 4 described later.

Fig. 3 is the top view of a modification of the apparatus shown in Fig. 2 wherein only one series of contacts 27 are provided in the disc 24 for connection to the shunt impedance; the line 8 (shown in Fig. 1) being directly connected to the bridge 12, instead of to the series of contacts 11.

Fig. 4 is a bottom view of the apparatus of Fig. 3 which shows the inductance coils 28 and 29, corresponding to impedances 5 and 13) mounted underneath the insulation disc 24. The lower ends of the contacts 27, 10 and 11, as well as the lower end of the pivot 25 are also shown.

Thus apparatus of this invention may be made very compact so that it may be placed in the base support of a wave collector. This is a great advantage in that it is simple to install. Another great advantage is that this apparatus is adjustable to compensate for any quadrantal error which might reasonably occur in any given pair of antennas. Therefore, it may be produced in large quantities, while previous correction devices have to be built especially for each different ship and each different location.

While the above is a specific application of this invention it is clear that many other applications and modifications will appear to those skilled in the art. For example: the apparatus of this invention may be applied not only to direction finding antennas on aircraft, sea going ships, and other vehicles, but also to stationary direction finding antennas located near reradiating elements for which compensation must be made. The wires in each loop may be increased or decreased as desired depending upon the sensitivity required from the apparatus. The number of separate antennas or wave collectors may be increased as long as there is an even number of them. The type of wave collectors or antennas employed may be either crossed-loops (as shown), dipole antennas, four vertical antennas, or other directional wave collectors employed in connection with direction finding apparatus, or apparatus wherein the direction of the wave is an important factor or in apparatus employing two or more antennas wherein the induced currents in one or more antennas must be corrected without changing its phase with respect to the induced currents in the other antennas. It has been found, however, that when employing the antennas of the induction type such as loops, the impedances employed in their circuits should be inductive impedances, but if the antennas are of the condenser type the impedances employed in their circuits should be condensers. Although there are only nine different tapped contacts shown to the impedances 5 and 13 correcting for every 3° of quadrantal error in the direction finder, more or fewer contacts may be provided to correct for intervals of greater than or less than 3°, or the adjustment may be of a continuous type such as a slide wire or variable condenser. Also the wire 8, may be directly connected to bridging member 19, instead of member 12, or may be connected to both, if desired thereby eliminating the series of contacts 18 in the disc 24. Thus, the above example shown in the drawings and described in the specification is merely by way of illustration and not to be considered a limitation of this invention as defined in the objects and in the accompanying claims.

We claim:

1. An adjustable apparatus for varying the induced current in one of two coupled radio wave collectors comprising: two impedances one of which is shunted across a portion of one of said collectors, and the other of which is coupled in series with said one collector, separate series of contacts tapped to each impedance for varying their amount, and manually adjustable means for cooperating with said contacts to simultaneously vary the amount of both impedances so that when the series impedance is increased the shunted impedance is decreased and vice versa, said contacts tapped to said shunted impedance are mounted in a semi-circle on an insulating disc and the contacts tapped to said series impedance are mounted in a diametrically opposed semi-circle on the same disc, and said adjustable coupling means is rotatably mounted on a pivot at the center of said disc.

2. An arrangement according to claim 1, wherein one of said series of contacts comprises two radially spaced concentric circular rows of contacts and the other series of contacts comprise a single circular row of contacts.

IRVING R. TAYLOR.
LARS LARSSEN.

REFERENCES CITED

The following references are of record in the file of this patent:

UNITED STATES PATENTS

| Number | Name | Date |
| --- | --- | --- |
| 1,458,466 | Crossley | June 12, 1923 |
| 2,201,162 | Elliott | May 21, 1940 |
| 2,279,422 | Vaudoux | Apr. 14, 1942 |

FOREIGN PATENTS

| Number | Country | Date |
| --- | --- | --- |
| 117,298 | Australia | Aug. 5, 1943 |
| 166,780 | Great Britain | July 28, 1921 |